Patented Nov. 9, 1937

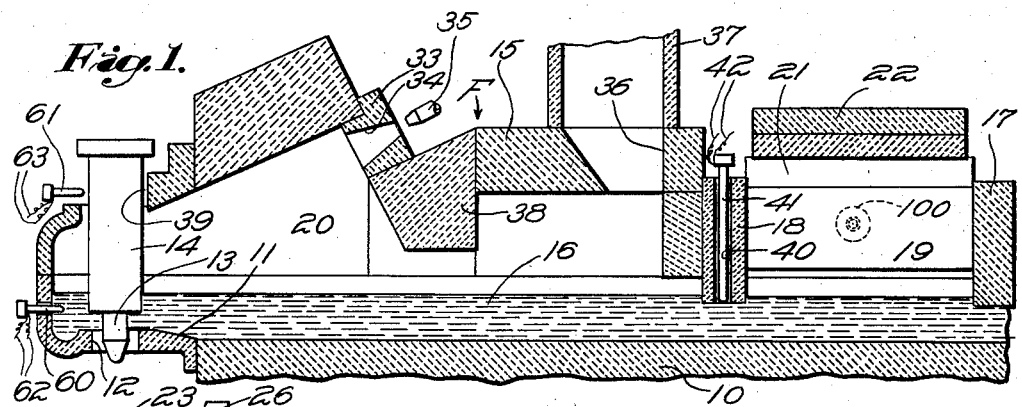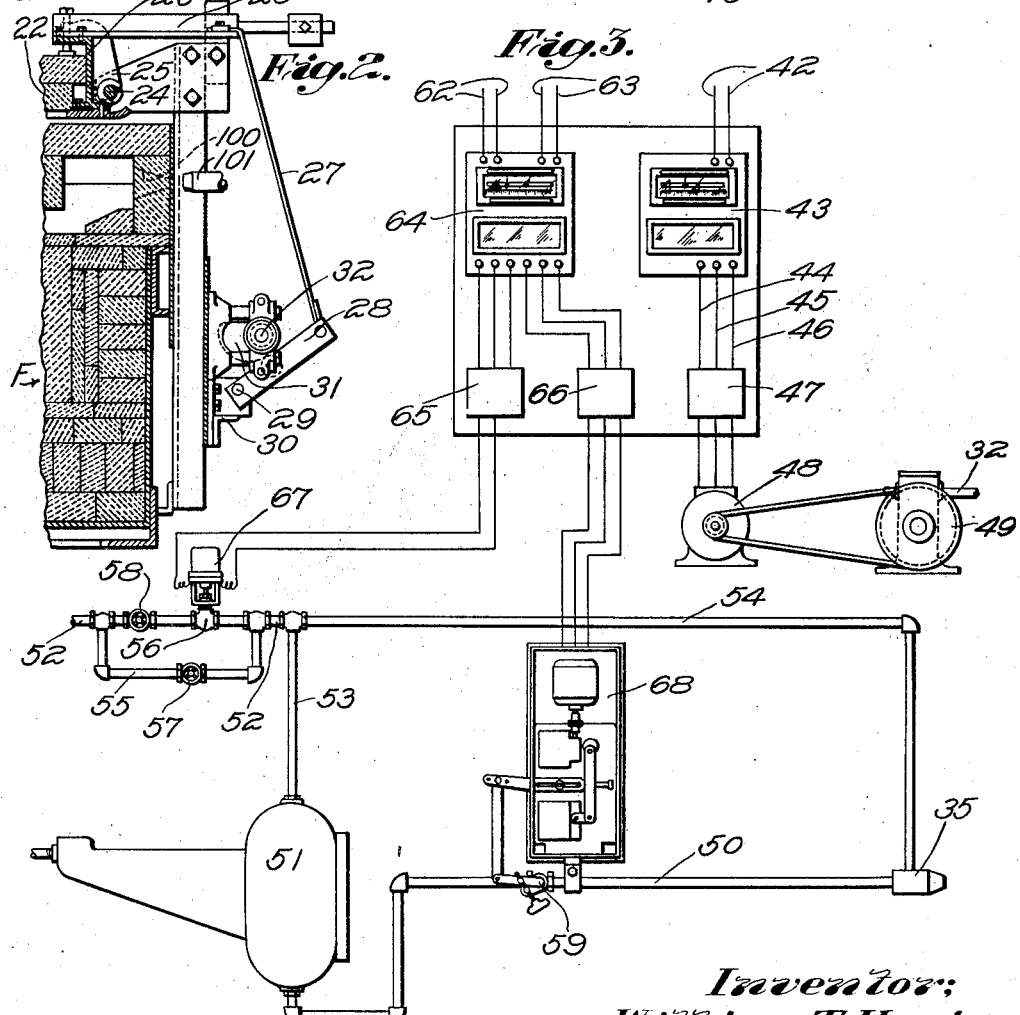

2,098,625

UNITED STATES PATENT OFFICE 2,098,625

MEANS FOR AND METHOD OF CONTROLLING THE TEMPERATURE AND CONDITION OF GLASS IN A FOREHEARTH

William T. Honiss, West Hartford, Conn., assignor to Hartford-Empire Company, Hartford, Conn., a corporation of Delaware Application January 5, 1934, Serial No. 705,348

9 Claims. (Cl. 49—55)

This invention relates generally to the regulation and control of the temperature and condition of molten glass in a forehearth, particularly in a forehearth of the type having a rear cooling chamber and a front or outer heating chamber, the cooling chamber being provided with means for regulably controlling the radiation of heat from the glass therein and the heating chamber being provided with a burner for discharging a liquid fuel thereinto.

An object of the present invention is to provide improved means for and methods of regulating and controlling the temperature and condition of glass in a forehearth of the type described so as to bring such glass to approximately the final temperature desired by the time such glass leaves the cooling chamber of the forehearth and for thereafter maintaining the temperature of that glass substantially constant, as such glass flows in the heating chamber of the forehearth from said cooling chamber to a glass feed outlet or other place of removal of glass adjacent to the outer end of the forehearth.

A further object of the invention is to provide means for regulating the radiation of heat from the glass in the cooling chamber of a forehearth of the type described in accordance with the temperature of the glass at a control point adjacent to the outer end of the cooling chamber.

A further object of the invention is to control the heating of the glass in the heating chamber of a forehearth of the type described by controlling the amount of oil and air discharging from the burner into the space above the glass in the heating chamber in accordance with the temperature of the glass at a point adjacent to the feed outlet or point of glass removal and for simultaneously controlling the character of the flame mass in the heating chamber so as to keep a complete blanket of flame over the surface of the glass in such chamber for each of different adjustments of the amount of oil and air discharging from the burner.

Other objects and advantages of the invention will hereinafter be pointed out or will become apparent from the following description of a practical embodiment of the invention, as shown in the accompanying drawing, in which:

Figure 1 is a longitudinal vertical section through a forehearth equipped with temperature control means embodying structural features of the invention and adapted for use in carrying out my improved method, the view being largely diagrammatic and only such parts being shown in detail as are believed necessary to afford an understanding of the invention;

Fig. 2 is a fragmentary vertical section through one side portion of the cooling chamber of the forehearth, showing a means for hingedly supporting and raising and lowering a closure for a radiation control opening in the top of the cooling chamber; and Fig. 3 is a diagrammatic plan view of automatic means that may be employed to control the raising and lowering of the closure for the radiation control opening of the cooling chamber and for controlling both the amount of the mixture of oil and air supplied to the burner and the character of the flame that will be produced by the combustion of the liquid fuel in the heating chamber.

Referring now to the drawing, I show in Fig. 1 a forehearth generally designated F. This forehearth may comprise a refractory channel 10 adapted at its inner or rearward end for connection in any suitable known manner with a melting tank (not shown) or other source of supply of molten glass. The outer end portion of the channel 10 is formed to provide a feed spout 11 having an outlet 12 in its bottom from which molten glass may issue under the control of suitable glass feeding mechanism, such as the vertically disposed refractory plunger 13 and its surrounding refractory sleeve 14.

Neither the outlet structure nor any means for supporting and operating the feeding members 13 and 14 are shown, as such parts are well known in the art and, per se, form no part of the present invention. It is sufficient to note at this point that glass issuing from the outlet 12 is intended to be of suitable temperature and viscosity to form, under the control of the feeding mechanism, successive suspended mold charge masses from which successive similar charges of uniform temperature and condition may be severed and subsequently fabricated into articles of glassware.

In addition to the glass conducting channel 10—11, the forehearth comprises a suitable cover structure which, as a whole, is designated 15. A space is provided within this cover structure above the glass, indicated at 16, in the glass flow channel. This space may be separated from the associated melting tank or like source of supply of molten glass by a rear transverse refractory gate or baffle 17, the lower edge portion of which depends below the level of the glass in the flow channel. The gate or baffle 17 thus may be employed to shut off the space above the glass in the forehearth from the heat and draft conditions above the glass in the associated melting tank or other source of supply of molten glass.

The space above the glass in the forehearth is divided by a transversely extending refractory skimmer block or baffle 18 to provide a rear heat radiation control or cooling chamber 19 and a front heating chamber 20. The top of the cooling chamber may be provided with a longitudinally extending opening 21 in the middle portion thereof, adapted to be substantially closed by a refractory closure 22 when the latter rests flatwise on the cover structure of the forehearth. A side wall or the side walls of the cooling chamber may be provided with a burner port or ports, such as that indicated at 100. A burner such as indicated at 101, Fig. 2, may be associated with each such port for applying heat to the glass in the cooling chamber, if required.

The closure 22 is shown as comprising a single lid or cover which is carried by a frame 23, Fig. 2, that is hinged at 24 to a fixed supporting structure 25 on the forehearth top and at one edge of the heat radiation control opening 21. A partially counter-weighted operating arm 26 extends laterally from the frame 23 and is connected by a cable 27 with the outer end of an operating lever 28. The lever 28 is pivotally supported at its inner end at 29 on a bracket 30 that is secured to the frame structure of the forehearth. A cam 31 on a driven shaft 32 bears against the inclined upper side of the lever 28, the arrangement being such that when the shaft 32 is turned angularly about its axis in one direction, the closure 22 will be raised from its closed position, so as to permit radiation of heat from the glass in the cooling chamber 19 through the heat radiation control opening 21.

When the shaft 32 is turned angularly about its axis in the opposite direction, the closure 22 will be permitted to descend toward position to cover the heat radiation control opening 21.

The closure for the heat radiation control opening 21 and the operating mechanism therefor may be constructed in any suitable known way and of any suitable known parts, so long as such mechanism is adapted to employ an angular turning movement of a shaft, such as the shaft 32, in one direction to open the heat radiation control opening more or less and to employ an angular turning movement of such shaft in the opposite direction to close the heat radiation control opening. The particular closure means and its operating mechanism, as shown in Fig. 3, are intended to serve only as simple examples of suitable parts.

The portion of the cover structure of the forehearth above the heating chamber may include a forwardly inclined burner block 33 which has formed therein a burner opening 34 through which a burner 35 may discharge a mixture of liquid fuel and air into the heating chamber in the direction of the glass above the feed outlet 12. Rearwardly of the burner block 33, but in advance of the skimmer block 18, the cover structure of the forehearth may be provided with a vent or outlet port 36, with which a stack 37 may be associated. The stack 37 may be provided with a damper (not shown) or any other known means for controlling the effective size of its outlet.

Intermediate the burner block 33 and the outlet port 36, the cover structure of the forehearth may be formed to provide a baffle 38 which extends transversely of the space above the glass in the forehearth and will be effective to direct the heated gases and flames in the heating space close to the surface of the glass during the passage of the flames and heated gases from the forward portion of the heating chamber rearwardly to the outlet port 36.

The portion of the cover structure above the feed spout or outer end portion of the glass conducting channel is provided with a suitable opening, such as is indicated at 39, to accommodate the upper end portion of the glass feeding mechanism. As shown, the opening 39 is sufficiently larger than the portion of the refractory sleeve 14 that extends therethrough to permit a sting-out of flame from the heating chamber.

The skimmer block 18 that forms the front wall of the rear or cooling chamber of the forehearth is provided with a vertical bore or passage, such as indicated at 40, for the reception of a thermo-couple 41. The lower end of this thermo-couple preferably extends to the lower end of the skimmer block 18 and thus to or below the level of the glass in the forehearth channel so as to be affected directly by the glass that is leaving the cooling chamber and is entering the outer or heating chamber of the forehearth. The thermo-couple 41 is connected electrically, as by the wires 42, with a suitable indicating control pyrometer, such as that shown diagrammatically at 43 in Fig. 3 of the drawing. This control pyrometer is connected electrically, as by the wires 44, 45 and 46 and the relay 47, with a reversible motor 48. The thermocouple 41 may be located in another wall of the forehearth channel, as in the bottom thereof.

The indicating control pyrometer is of such character as to periodically close a circuit through the middle and one of the outer of the three wires above mentioned for effecting periodic turning movements of the motor shaft in one direction whenever the temperature of the glass at the lower end of the thermo-couple 41 is above a predetermined temperature at which the pyrometer has been set and for similarly closing a motor operating circuit through the middle wire and the other outer wire of these three wires periodically to effect turning movements of the shaft of the motor 48 in the opposite direction whenever the temperature of the glass at the lower end of the thermo-couple 41 is lower than such predetermined temperature. The details of construction of the pyrometer are not shown because instruments of the character above described are well known in the art and may be purchased as commercial units. An example of a suitable indicating control pyrometer is the Brown Instrument Company's No. 801.

The motor 48 is connected with a suitable speed reduction mechanism, such as indicated at 49, having a driven shaft which may be the shaft 32, hereinbefore referred to as controlling the opening and closing of the shutter for the heat radiation control opening 21.

The operation of the means just described for controlling the cooling of the glass in the cooling chamber may be substantially as follows. The pyrometer may be set at the temperature desired for the glass at the feed outlet or point of removal. When the glass passing from the cooling chamber has a higher temperature, the pyrometer will function to impart an opening movement to the closure for the heat radiation control opening so as to permit an increased radiation of heat from the glass in the cooling chamber. When the glass passing from the cooling chamber has a temperature lower than that desired, a reverse or closing movement will be imparted to the radiation control closure. There may be fluctuations of temperature at the point controlled by the thermo-couple 41 from the temperature desired but such fluctuations will be kept within comparatively narrow limits under normal working conditions. By locating the thermo-couple 41 in the skimmer block at the front end of the cooling chamber, provision is made to bring the glass that has entered the forehearth to approximately the temperature that is desired at the feed outlet while such glass has a considerable distance to flow before arriving at the outlet and also without any appreciable lag in time after the necessity for a correction of temperature has been indicated before such correction is initiated.

Since the glass is brought to approximately the temperature desired while such glass is still a considerable distance from the feed outlet or point of removal of glass, an opportunity is afforded for equalization of temperature and homogenization of all the glass passing to the feed outlet or glass removal point. The glass at the feed outlet or removal point thus may be kept uniform in temperature and condition over a long period of time.

The amount of heat applied to the glass in the heating chamber and the character of the flames by which such heat is applied will be regulated and controlled automatically to maintain the temperature desired if that temperature has been reached when the glass leaves the cooling chamber and to aid in securing the desired homogeneity and equalization of temperature throughout the glass in the heating chamber. Should the temperature of the glass leaving the cooling chamber be slightly greater or less than that desired at the feed outlet, the heating means will be automatically adjusted to correct the temperature of the glass as it passes in the heating chamber to the outlet.

The means for and method of regulating and controlling the temperature and condition of the glass in the heating chamber of the forehearth, according to the present invention, will now be more particularly described.

The burner 35 is shown in Fig. 3 as being provided with a liquid fuel or oil feed pipe 50 to which oil passes from an oil float tank 51. An air supply line 52 has a branch 53 leading to the oil float tank 51 and another branch 54 leading to the burner 35. Air from the pipe 54 mingles with the liquid from the pipe 50 at the burner 35 in the usual way so as to aid and support combustion at the burner mouth and in the heating chamber. The pressure of air in the branch line 53 controls the rate of flow of oil from the latter through the pipe 50 to the burner 35 in the well known manner. Consequently, when the amount of air passing through the line 52 is increased, both the amount of oil passing through the pipe 50 to the burner and the amount of air passing through the line 54 to the burner are proportionately increased. This is the usual way in which an increased heating effect is obtained by the use of a liquid fuel burner.

A minimum amount of air for mixing with the liquid fuel at the burner and for producing a minimum flow of liquid fuel from the float tank 51 through the pipe 50 may be assured by providing the air supply line 52 with a by-pass line 55 which communicates with the line 52 at opposite sides of a valve 56. The by-pass line 55 may be provided with a manually operable valve 57 which is adjusted to permit the desired minimum flow of air to the branch lines 53 and 54 when the valve 56 is closed. A normally open shut-off valve 58 may be provided in the line 52 between the ends of the by-pass 55.

The valve 56 in the air supply line 52 and a valve 59 in the oil feed line 50 are operated automatically in accordance with certain conditions in the heating chamber when the present invention is carried into effect. To this end, a thermocouple 60, Fig. 1, is arranged to extend through a wall of the forehearth into the glass at a point adjacent to the outlet or point of removal of glass from the forehearth. Another thermo-couple, indicated at 61, Fig. 1, is disposed in operative position with respect to the sting-out space between the wall of the refractory tube 14 and the opening 39 in the top of the forehearth structure. The thermo-couples 60 and 61 are connected electrically, as by the wires 62, 62 and 63, 63 with a two-point indicating control pyrometer, such as that indicated generally at 64 in Fig. 3.

This pyrometer is obtainable as a unit and may have any one of a plurality of different particular forms of construction, all well known in the art. An example of a suitable pyrometer is the Brown Instrument Company's two-point indicating control pyrometer No. 852. The pyrometer 64 is connected electrically through suitable relays, such as those indicated at 65 and 66, respectively, with a solenoid valve control mechanism 67 and a motor controlled valve operating mechanism 68, respectively.

The solenoid valve control mechanism 67 may be of any suitable known type of construction, an example of which is the Brown Instrument Company's Model 808, and is adapted to respond to temperature variations at the point controlled by the thermo-couple 60 so as to effect an opening movement to the valve 56 when the temperature at that control point falls below a predetermined temperature for which the instrument 64 has been set, and to cause closing movement of the valve 56 when the temperature at such control point is greater than the predetermined temperature for which the instrument 64 has been set.

The motor controlled valve operating mechanism 68 likewise may be of any suitable known type of construction, many examples of which are available on the market, one of which being the Brown Instrument Company's Model 896. This mechanism 68 is of the modulating type and is adapted to effect modulated or step by step opening movements of the valve 59 so long as the temperature at the flame sting-out space controlled by the thermo-couple 61 is less than that for which the controlling portion of the instrument 64 has been set and to effect modulated or step by step closing movements of the valve 59 whenever the temperature to which the thermo-couple 61 is subjected is greater than the predetermined temperature desired.

If the glass entering the heating chamber has a temperature corresponding to that desired at the feed outlet, the automatic control mechanism just described is intended to function to secure this same temperature condition at the feed outlet while also permitting and aiding further homogenizing and equalization of temperature of the different portions of the glass in the heating chamber. Fluctuations in temperature may occur at the point at which the thermo-couple 60 is located, i. e., at a point adjacent to the outlet or point of glass removal, thereby necessitating corrective action by the control mechanism. In the event that the temperature of the glass at the thermo-couple 60 is too high, the automatic mechanism that is controlled by the thermo-couple 60 will function to effect a closing movement of the valve 56, thereby reducing the amounts of both air and oil supplied to the burner and thus reducing the heating action on the glass in the heating chamber. Should this reduction of the heating action on the glass in the heating chamber be attended by a reduction in flame mass so that the flame sting-out past the thermo-couple 61 is substantially reduced, that thermo-couple will be affected so as to initiate operation of the mechanism that it controls to open the valve 59 as required to produce a softer flame in the heating chamber. On the other hand, should the valve 56 be operated to increase the amounts of liquid fuel and air that are supplied to the burner, the flame sting-out might become undesirably large. In that event, the thermo-couple 61 would be affected and by the operation of the automatic mechanism that it controls, would effect a closing movement of the valve 59 so as to reduce the amount of oil supplied to the burner without a corresponding reduction in the amount of the air that is supplied thereto. This would cause a decrease in the flame mass and a change in the character of the flames in the forehearth.

The conjoint or coordinated operations of the mechanisms which are controlled by the thermo-couples 60 and 61 assure regulation of the amount of heat supplied to the glass in the heating chamber in accordance with the temperature of the glass adjacent to the feed outlet or point of glass removal, and at the same time assure a continuous or complete blanket of flame over the surface of the glass in the heating chamber.

Obviously, the invention is susceptible of embodiment in forms other than that which has been illustrated in the accompanying drawing and particularly described herein. The method of the invention likewise may be varied from that which has been particularly described. The invention therefore is not to be limited beyond the terms of the appended claims.

I claim:

1. The combination with a forehearth adapted at one end to receive molten glass from a source of supply, said forehearth comprising separate cooling and heating chambers, the cooling chamber being located between the heating chamber and said source of supply of molten glass, said cooling chamber having adjustable heat radiation control means for controlling the amount of radiation of heat from the glass therein, a thermocouple located at the outer end of said cooling chamber, means operatively connecting said thermocouple with said heat radiation control means for adjusting the latter automatically under the control of the thermocouple, a burner for discharging liquid fuel and air into the space above the glass in the heating chamber, a thermocouple having a portion located in the glass adjacent to the outer end of the forehearth, means operative by said second named thermocouple for automatically adjusting the amounts of both the liquid fuel and air discharging from said burner in accordance with the temperature of the glass in the proximity of said second named thermocouple, an additional thermocouple in position to be affected by a sting-out of flame from the outer end portion of the forehearth, and automatic means controlled by said last named thermocouple for independently varying the amount of liquid fuel supplied to said burner.

2. The combination with a forehearth having separate cooling and heating chambers, means for controlling the cooling of the glass in the cooling chamber in accordance with the temperature of the glass at the outer end of the cooling chamber, means for projecting liquid fuel and air into the space above the glass in the heating chamber, automatic means for controlling the amounts of both liquid fuel and air supplied to said burner in accordance with the temperature of the glass at a control point adjacent to the outer end of said forehearth, and other automatic means for controlling the character of the flame produced by the combustion of said air and liquid fuel in accordance with the flame sting-out at a point adjacent to the outer end of said forehearth.

3. In combination with a forehearth having a rear cooling chamber and a front heating chamber, means for cooling molten glass in the cooling chamber, a burner adapted to discharge liquid fuel and air into the space above the glass in the heating chamber, automatic means including a thermocouple in operative position with respect to the glass at a control point in said heating chamber for adjusting the amounts of both air and liquid fuel discharging from said burner in accordance with the temperature of the glass at said control point, and other automatic means including a thermocouple in position to be affected by a flame sting-out from said heating chamber for controlling the character of the flame from said burner in accordance with the amount of said flame sting-out.

4. In combination with a forehearth for molten glass, said forehearth having a submerged discharge outlet adjacent to its outer end and having a flame sting-out port above the glass over said outlet, adjustable means for applying flame to the glass over said outlet, automatic means for adjusting said flame applying means in accordance with the temperature of the glass at a control point adjacent to said outlet, and other automatic means for making a further adjustment of said flame applying means in accordance with the amount of flame sting-out through said sting-out port.

5. In combination with a forehearth for molten glass, said forehearth having a glass feed outlet adjacent to its outer end, adjustable means for heating the glass passing to said outlet, automatic means including a thermocouple in contact with the glass at a control point adjacent to the outlet for regulably controlling said heating means in accordance with the temperature of the glass at said control point, and other automatic means including a thermocouple located above the glass in the outlet end of the forehearth and out of contact with the glass for further regulably controlling said heating means in accordance with the thermal condition adjacent to said last named thermocouple.

6. In combination with a forehearth for molten glass, of a burner for discharging liquid fuel and air into the space above the glass in a portion of the forehearth, automatic means including a thermocouple in operative position with respect to the glass at a definite control point in a portion of said forehearth for controlling the amounts of liquid fuel and air supplied by said burner to control the heating action on the glass in the forehearth, and other automatic means including a thermocouple located above the glass in the forehearth for further controlling said burner to control the character of the flames resulting from the burner operation.

7. The combination with a forehearth for molten glass, said forehearth having a submerged discharge outlet adjacent to its outer end and having a sting-out port above the glass over said outlet, a burner for discharging liquid fuel and air into the space above the glass in the forehearth and toward the glass over the outlet, a thermocouple extending into the glass adjacent to the discharge outlet, a second thermocouple located outside of the forehearth at the outer end of said sting-out port, and means controlled by said thermocouples for adjusting the amounts of both liquid fuel and air supplied by the burner in accordance with the temperature of the glass in contact with said first named thermocouple and for independently controlling the amount of only the liquid fuel supplied to the burner in accordance with the amount of flame sting-out through said sting-out port.

8. The method of controlling the temperature and condition of molten glass in a forehearth, which comprises the steps of passing glass in a stream from a source of supply successively through a cooling chamber and a heating chamber to a discharge outlet that is located adjacent to the outer end of said heating chamber, controlling the cooling of the glass passing through the cooling chamber in accordance with the temperature of the glass at a control point adjacent to the outer end of said cooling chamber, applying flames from a burner to the glass in the heating chamber, controlling the heating effect of the flames from the burner on the glass in the heating chamber in accordance with the temperature of the glass at a control point adjacent to said discharge outlet, and controlling the character of the flames in accordance with the sting-out of flames through a port above the glass adjacent to said discharge outlet.

9. In a method of controlling the temperature and condition of molten glass in a forehearth having a submerged discharge outlet adjacent to its outer end and a sting-out port above the glass over said discharge outlet, comprising the steps of projecting liquid fuel and air from a burner into the forehearth toward the glass over said outlet, regulably controlling the amounts of both liquid fuel and air supplied by the burner in accordance with the temperature of the glass at a control point adjacent to said outlet, and independently regulating the amount of only the liquid fuel supplied to the burner in accordance with the amount of flame sting-out through said sting-out port.

WILLIAM T. HONISS.